United States Patent
Sensyu

(10) Patent No.: US 6,201,778 B1
(45) Date of Patent: Mar. 13, 2001

(54) OPTICAL DISK WITH A GROOVE FOR DEFINING SERIAL DATA MODULATED INTO A SIGNAL USING PHASE AND FREQUENCY MODULATION

(75) Inventor: Susumu Sensyu, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/075,627

(22) Filed: May 11, 1998

(30) Foreign Application Priority Data

May 14, 1997 (JP) .................................................. 9-123842

(51) Int. Cl.$^7$ ....................................................... G11B 7/00
(52) U.S. Cl. ........................................... 369/59; 369/275.3
(58) Field of Search .................................. 369/275.3, 59, 369/58, 47, 48, 44.13

(56) References Cited

U.S. PATENT DOCUMENTS

| | | | |
|---|---|---|---|
| 5,809,006 | * | 9/1998 | Davis et al. ............................ 369/50 |
| 5,835,461 | * | 11/1998 | Kobayashi et al. ................ 369/44.13 |
| 5,852,599 | * | 12/1998 | Fuji .................................... 369/275.4 |
| 5,953,297 | * | 9/1999 | Maida et al. ............................ 369/32 |
| 5,963,518 | * | 10/1999 | Kobayashi et al. ..................... 369/59 |
| 5,978,333 | * | 11/1999 | Kobayashi et al. ..................... 369/59 |
| 5,999,504 | * | 12/1999 | Aoki .................................. 369/44.13 |
| 6,031,816 | * | 2/2000 | Inui et al. .......................... 369/275.3 |

* cited by examiner

*Primary Examiner*—Nabil Hindi
(74) *Attorney, Agent, or Firm*—Frommer Lawrence & Haug, LLP.; William S. Frommer; Glenn F. Savit

(57) ABSTRACT

In an optical disc manufacturing method and an optical disc device, when serial data are subjected to phase modulation and then subjected to frequency modulation to trace a groove, in modulated signals based on phase modulation corresponding to the first half portion and the last half portion of each bit of the serial data, the phase modulation is performed so that the period of the logic "1" and the period of the logic "0" are equal to each other. In the modulated signals based on the frequency modulation, the number of the frequency cycles corresponding to the respective logic levels are equal to each other.

16 Claims, 14 Drawing Sheets

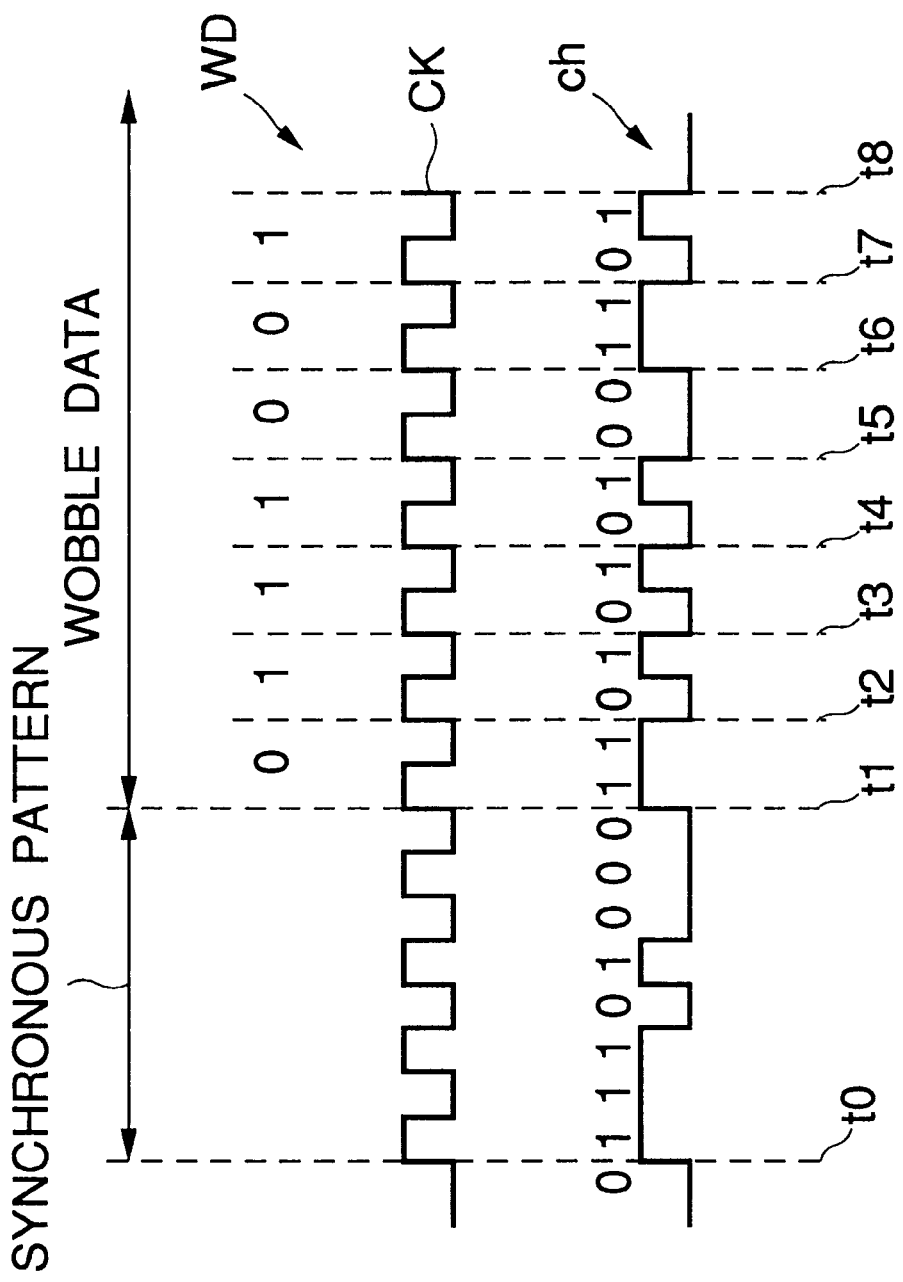

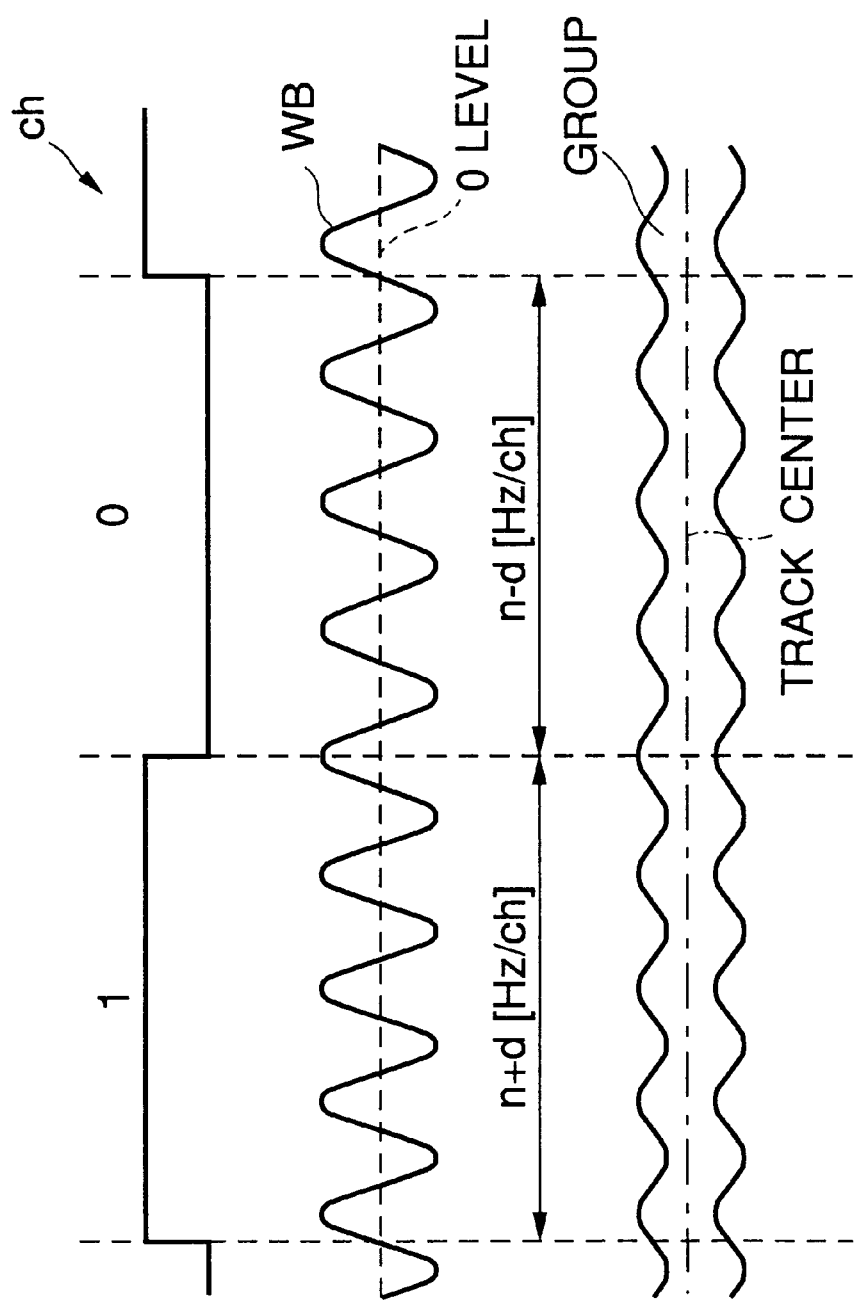

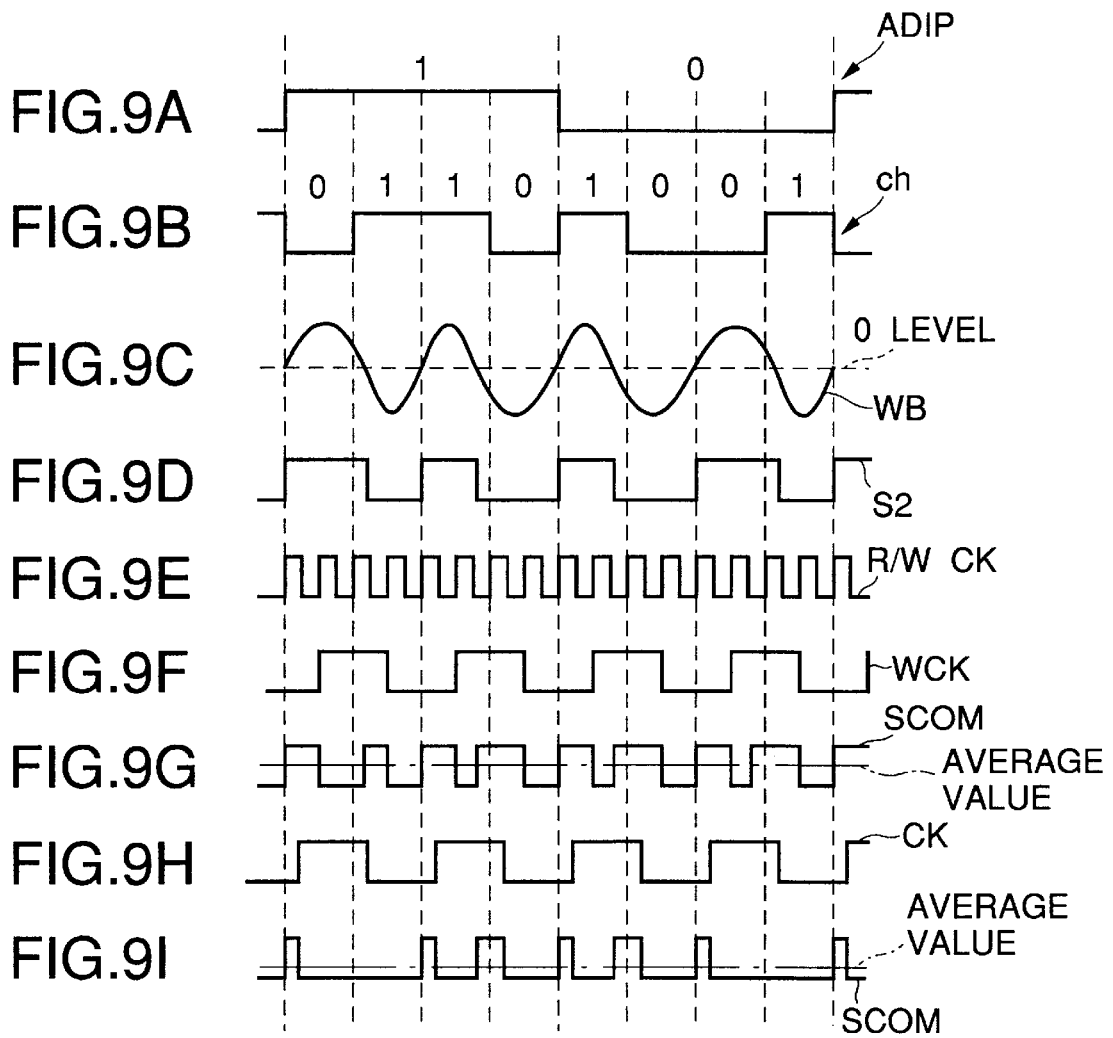

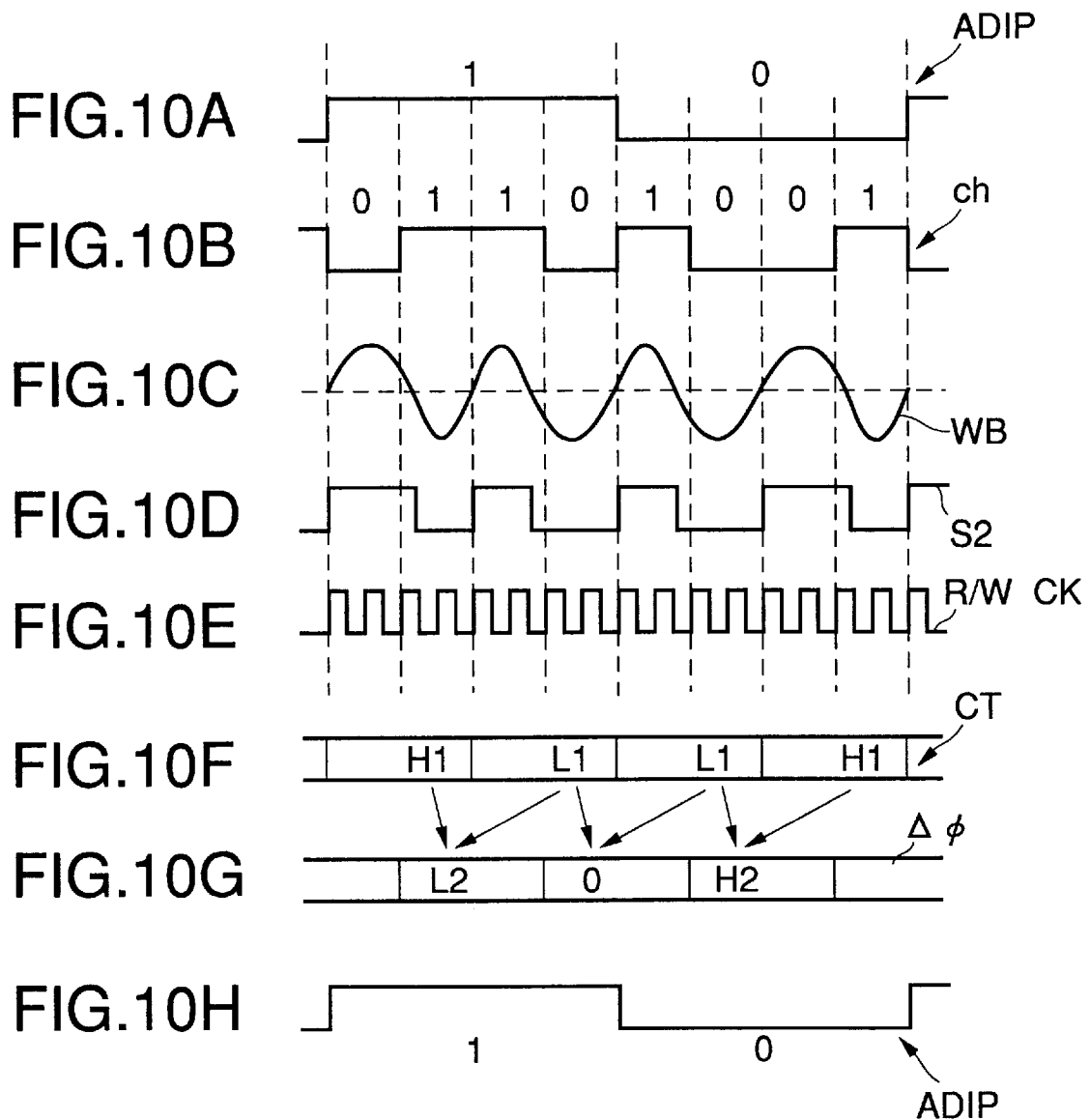

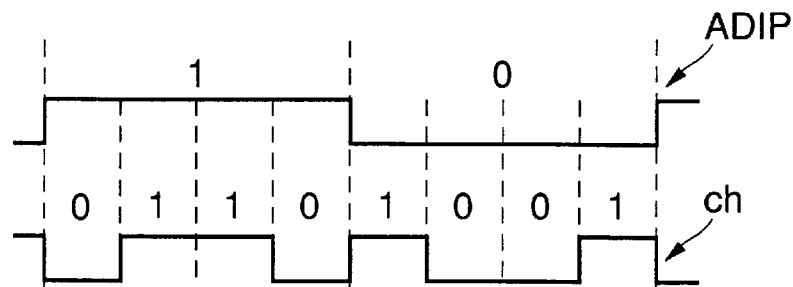
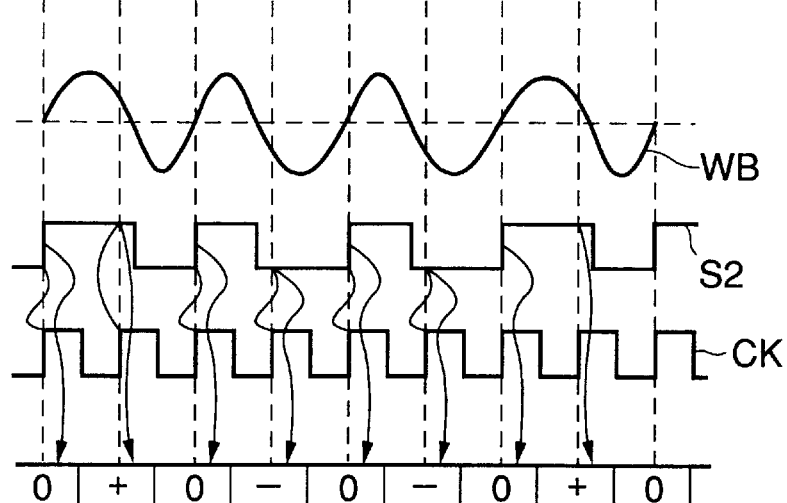
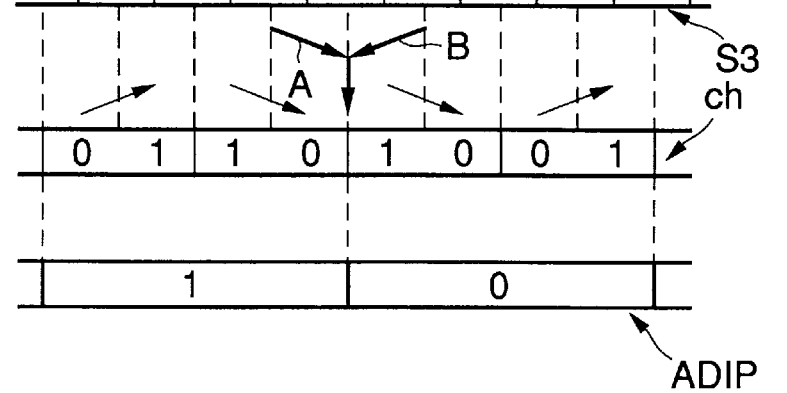

OPTICAL DISK WITH A GROOVE FOR DEFINING SERIAL DATA MODULATED INTO A SIGNAL USING PHASE AND FREQUENCY MODULATION

BACKGROUND OF THE INVENTION

The present invention relates to a method of manufacturing an optical disc and an optical disc device, and particularly is applicable to an optical disc on which serial data such as positional information, etc. are recorded by providing a groove with a guide groove for a laser beam. According to the present invention, when the serial data are phase-modulated and then frequency-modulated, the phase modulation is performed so that a period of logic "1" and a period of logic "0" are set to be equal to each other in modulated signals based on the phase modulation which correspond to the first half portion and the last half portion of each bit of the serial data respectively, thereby generating clocks with high precision.

In an optical disc, positional information on a laser beam, time information, etc. (hereinafter referred to as "wobble data") are detected on the basis of a groove serving as a guide groove for the laser beam. That is, in a manufacturing process for this type of the optical disc, a laser beam is illuminated (directed) onto a master disc while the master disc is rotated at a predetermined rotational speed. The illuminating position of the laser beam is successively displaced to the outer circumference of the master disc. Accordingly, during the manufacturing process, the master disc is exposed to the laser beam to form a track from the inner circumference to the outer circumference of the master disc in a spiral configuration.

In the optical disc manufacturing process as described above, developing and electro-forming steps are performed, and then a stamper is formed on the basis of the master disc. Thereafter, an optical disc is formed on the basis of the stamper. Accordingly, the optical disc is provided with a spiral groove extending from the inner circumference to the outer (peripheral) circumference in conformity with the illumination of the laser beam.

In the optical disc manufacturing process, when the master disc is exposed to the laser beam as described above, a reference signal synchronized with a predetermined carrier signal is frequency divided to generate a clock CK (see FIG. 1B). Further, a first reference signal synchronized with the clock and a second reference signal being a ½ frequency-divided signal of the clock CK are arranged in accordance with the logic level of wobble data ADIP (see FIG. 1A) respectively, whereby the wobble data is subjected to bi-phase mark modulation (see FIGS. 1A, 1B and 1C). Further, a synchronous pattern is inserted into the serial data generated by the bi-phase mark modulation as described above to form a channel signal (ch), and then a carrier signal used to generate the clock CK is frequency-modulated by the channel signal (ch) to form a modulated signal WB (hereinafter referred to as "wobble signal"). In the optical disc manufacturing process, the illuminating position of the laser beam is displaced in the radial direction of the master disc while following the signal level of the wobble signal WB.

Accordingly, a groove is formed on this type of the optical disc so as to be meandered (traced) in accordance with the synchronous pattern and the wobble data, and a spindle motor is controlled for rotation at a predetermined rotational speed so that the center frequency is set to a predetermined frequency. The wobble data are detected on the basis of the groove so that the recording/reproducing position can be checked. Further, reference clocks for various processing operations can be generated on the basis of the groove (see FIGS. 2A to 2C).

However, the optical disc as described above has a disadvantage that a clock cannot be generated with high precision from an area where the wobble data are recorded. That is, representing the ½ frequency of the clock CK by (ch) and representing the frequency of the carrier signal by n [Hz/ch], n+d [Hz/ch] is allocated to the logic "1" of the channel signal (ch) and n−d [Hz/ch] is allocated to the logic "0" of the channel signal (ch) to generate the wobble signal WB.

In order to simplify the description, assuming that n=4 and d=¹⁄₁₆, when the wobble signal WB crosses zero at the start time t0 of the synchronous pattern (FIG. 1A), DSV (Digital Sum Value) is set to zero in the synchronous pattern, whereby the wobble signal WB can cross zero at the end time t1 of the synchronous pattern.

However, at the subsequent falling time t2 of the clock CK, the wobble signal is kept at the frequency n+d [Hz/ch] for only one period of the clock CK, and thus the zero cross timing of the wobble signal WB is varied by only 2p/16 period.

Further, at the subsequent falling time t3 of the clock CK and at the additional subsequent time points t4 and t5, the wobble signal is kept at the frequency of n+d [Hz/ch] for only half a period of the clock CK, and then kept at the frequency of n−d [Hz/ch] for a subsequent half period, whereby the cross timing of the wobble signal WB is kept varied by only 2p/16 period.

At the subsequent falling time t6 of the clock CK, the wobble signal has the frequency n−d [Hz/ch] by only one period of the clock CK, whereby the phase variation from the time point t1 to the time point t2 is canceled, and the wobble signal WB crosses zero.

Accordingly, in the wobble signal WB which follows the groove, the zero-cross timing is varied relative to the clock CK. Thus even when the wobble signal WB is reproduced by detecting the groove, it is difficult to generate a high-precision clock from the reproduced wobble signal WB.

There may be considered a method of detecting the timing at which the wobble signal WB crosses zero, and locking a PLL circuit on the basis of this timing to generate a high-precision clock. However, in practice it is difficult to generate the high-precision clock because the clock varies in accordance with the content of the wobble data based on the timing at which the wobble signal WB crosses zero.

SUMMARY OF THE INVENTION

The present invention has been implemented in view of the foregoing, and has an object to provide an optical disc manufacturing method and an optical disc device which generate a high-precision clock by following a groove.

Accordingly, in the optical disc and the optical disc device for accessing the optical disc, serial data can be decoded by detecting a phase of the wobble signal thereby generating a clock on the basis of the wobble signal. The phase of the wobble signal can be reliably detected by determining the polarity of the wobble signal on the basis of the clock in the decoder, or by detecting the zero-cross timing of the wobble signal.

According to the present invention, a method for manufacturing an optical disc with a groove for defining serial data containing a plurality of bits comprises the following steps: generating a first modulated signal by phase modulating the serial data such that a first time interval for a high logic level is equal to a second time interval for a low logic level; generating a second modulated signal by frequency modulating the first modulated signal such that a frequency cycle corresponds in duration to one of the high logic levels combined with one of the low logic levels of the first modulated signal, and such that a first frequency component in the frequency cycle corresponds to the high logic level and a second frequency component in the frequency cycle corresponds to the low logic level, the first frequency component being different from the second frequency component; and providing the groove on the optical disc in accordance with the generated second modulated signal.

In accordance with one aspect of the present invention, the first frequency component is higher in frequency than the second frequency component.

BRIEF DESCRIPTION OF THE DRAWINGS

FIGS. 1A to 1C are signal waveform diagrams showing bi-phase mark modulation;

FIGS. 2A to 2C are diagrams showing characteristic curve lines to explain generation of a groove;

FIGS. 9A to 9I are signal waveform diagrams showing the operation of the wobble signal processing circuit of FIG. 8;

FIGS. 10A to 10H are signal waveform diagrams subsequent to the signal waveform diagrams of FIGS. 9A to 9I;

FIGS. 14A to 14H are signal waveform diagrams showing the operation of the wobble signal processing circuit of FIG. 13.

DETAILED DESCRIPTION OF THE PREFERRED EMBODIMENTS

Preferred embodiments according to the present invention will be described hereunder with reference to the accompanying drawings.

(1) First Embodiment

Figure 3:
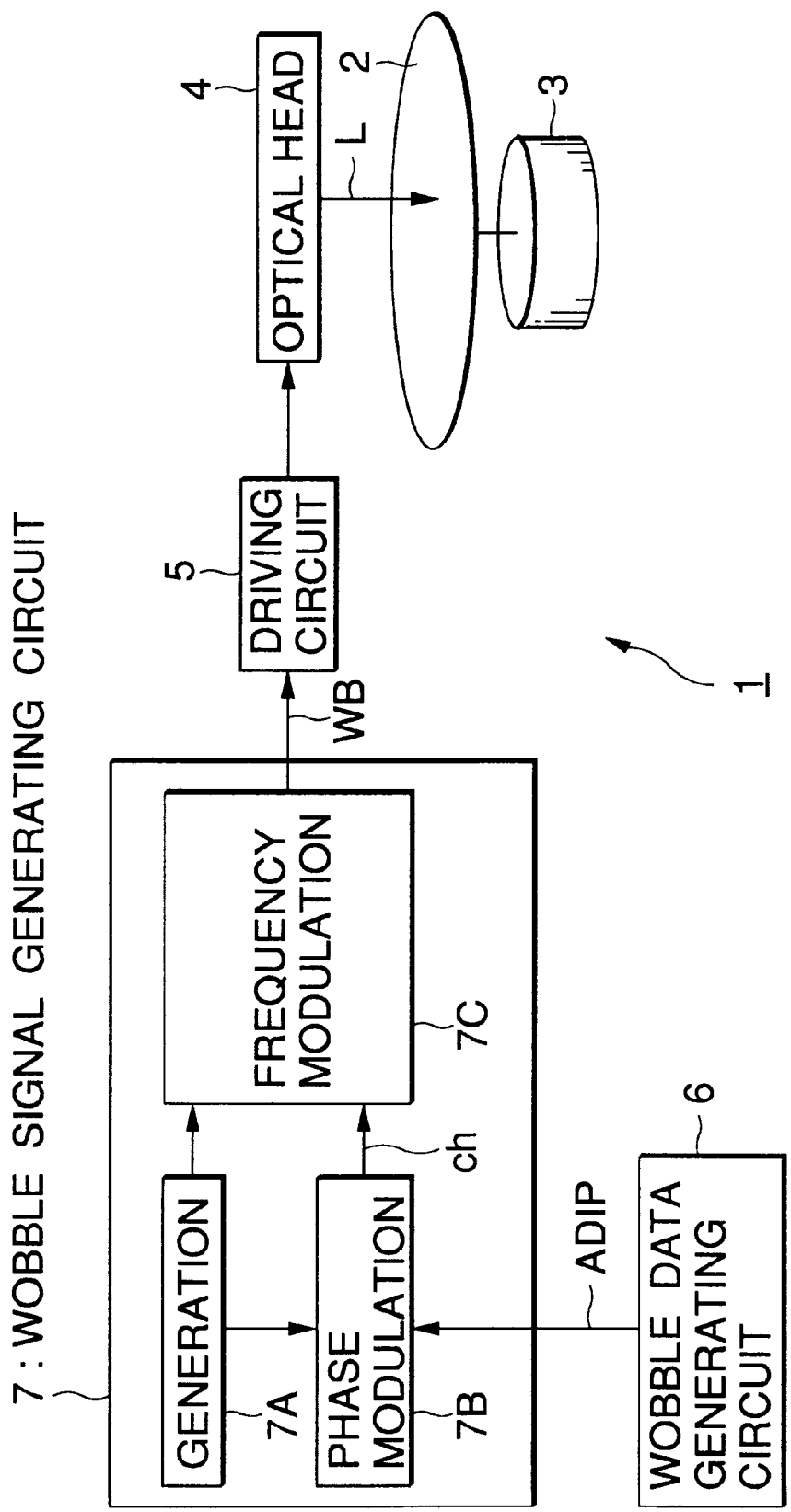
FIG. 3 is a block diagram showing a mastering device for generating a wobble signal.

FIG. 3 is a block diagram showing a mastering (master) device according to one embodiment of the present invention. In a process of manufacturing an optical disc according to this embodiment, a master disc 2 is exposed to a laser beam by the mastering device 1, and optical discs are manufactured from the master disc 2.

In the mastering device 1, the master disc 2 is formed by coating resist on the surface of a glass substrate, for example, and the disc is rotated at a predetermined rotational speed by a spindle motor 3.

An optical head 4 emits a laser beam L onto the master disc 2 while being successively displaced from the inner circumference of the master disc 2 to the outer peripheral circumference in synchronism with the rotation of the master disc 2 by a sled mechanism (not shown), whereby the optical head 4 generates a spiral track from the inner portion of the master disc 2 to the outer portion. Further, the optical head 4 is constructed so that an optical system therein is movable in the radial direction of the master disc 2, and a driving circuit 5 drives the optical system of the optical head 4 in accordance with the wobble signal WB, whereby the illuminating position of the laser beam L is followed in accordance with the wobble signal WB.

A wobble data generating circuit 6 generates and outputs wobble data ADIP successively varied in accordance with the displacement of the optical head 4. That is, the wobble data generating circuit 6 receives from the spindle motor 3 or the like a timing signal (comprising an FG (frequency generating) signal, etc.) which is synchronized with the rotation of the master disc 2, and this timing signal is counted by a counter (not shown). Accordingly, the wobble data generating circuit 6 generates a frame number (Sync no) whose value successively varied in the period corresponding to $\frac{1}{16}$ revolution of the master disc 2 for example, and a track number (track no) whose value varies every time the illuminating position of the laser beam L is displaced by one track in accordance with the variation of the frame number (Sync no).

Accordingly, the wobble data generating circuit 6 generates address data based on the frame number (Sync no) and the track number (track no). Illustratively shown, the wobble data generating circuit 6 generates the frame number (Sync no) and the track number (track no) with 4 bits and 20 bits, respectively.

Figure 4:
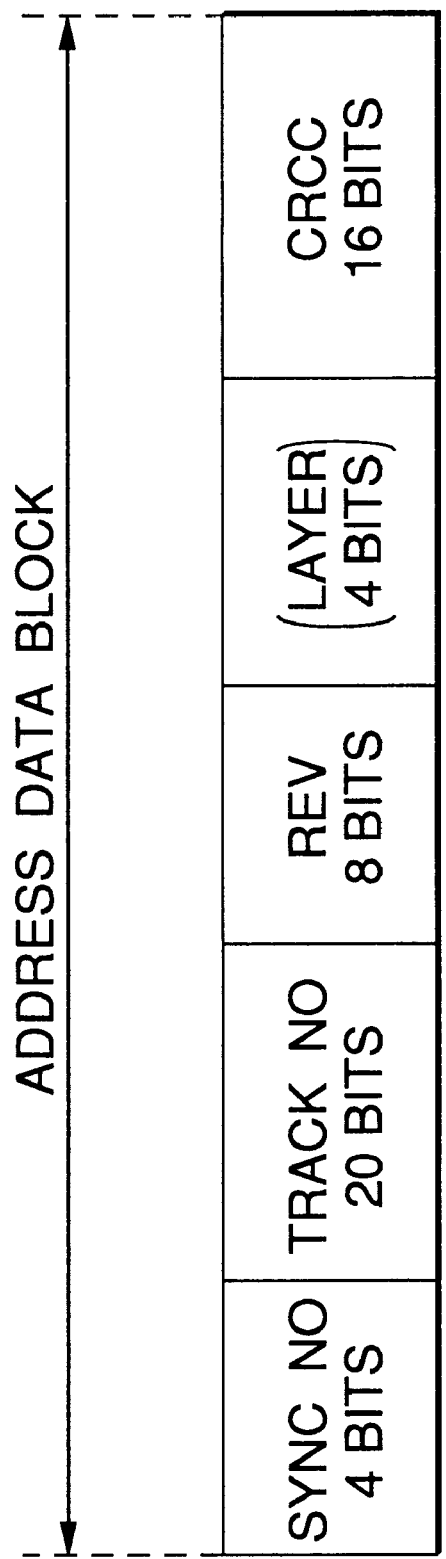
FIG. 4 is a graph showing an address data block in a mastering device.

The wobble data generating circuit 6 appends the frame number (Sync no) and the track number (track no) with a bit (rev) for reservation, and executes predetermined calculation processing by using information word M (x) based on the frame number (Sync no), the track number (track no) and the bit (rev) for reservation to generate an error detection code CRCC (Cyclic Redundancy Check Code) and successively generate wobble data blocks having a format shown in FIG. 4. Representatively shown, the wobble data generating circuit 6 forms each wobble data block with 48 bits.

At this time, the wobble data generating circuit 6 generates the wobble data so that at least one bit inversion occurs in one address data block by reversing and setting the logic level of the error detection code CRCC or by operating the bit (rev) for reservation. Further, if needed, subsequent 4 bits are allocated to the data of a recording layer. An optical disc which is formed by the master disc 2 has information recording layers, and the information recording layer is specified by the data of the recording layer. When the wobble data generating circuit 6 sets the data of the recording layer, the data of the recording layer are also used as information word M (x) for the calculation of the error detection code CRCC.

The wobble data generating circuit 6 successively generates the wobble data block in synchronism with the rotation of the master disc 2 as described above, and successively outputs the wobble data block thus generated as wobble data ADIP to the wobble signal generating circuit 7.

The wobble signal generating circuit 7 generates the wobble signal WB on the basis of the wobble data ADIP or the like. In the wobble signal generating circuit 7, a generating circuit 7A generates and outputs a predetermined reference signal. In the mastering device 1, the spindle motor 3 is subjected to the spindle control by using the reference signal generated in the generating circuit 7A, thereby generating the wobble signal WB which is synchronized with the rotation of the master disc 2.

In accordance with the logic level of the wobble data ADIP, a phase modulating circuit 7B allocates a first reference clock f1 which is synchronized with the phase of the reference signal, and a second reference clock f2 which is different in phase from the first reference clock f1 by 180 degrees, thereby phase-modulating the wobble data ADIP to generate a channel signal (ch).

At this time, as shown in FIGS. 5A–5E, the phase modulating circuit 7B allocates the first and second reference clocks f1 and f2 so that channels of even number are formed at the first half and the second half of each bit with respect to the timing (tc) corresponding to the center of each bit of the wobble data ADIP (in this case, two channels are formed at each of the first and last halves) and also so that the period of the logic "1" is equal to the period of the logic "0" at each of the first half and the second half.

That is, when the logic of the wobble data ADIP is "1", the phase modulating circuit 7B supplies the first reference clock for one period, and then supplies the second reference clock for another period, whereby the channel signal (ch) is generated so that the channels "0110" are sequential (FIGS. 5A, 5B-1, 5B-2 and 5C).

Conversely, when the logic of the wobble data ADIP is "0", the phase modulating circuit 7B supplies the second reference clock for another period, and then supplies the first reference clock for one period, whereby the channel signal (ch) is generated so that the channels "1001" are sequential. The wobble signal generating circuit 7 subjects the channel signal (ch) generated in the phase modulating circuit 7B to the frequency modulation in a subsequent frequency modulating circuit 7C as explained hereinbelow.

The frequency modulating circuit 7C performs the frequency modulation on the channel signal (ch) and outputs the modulated signal as the wobble signal WB. At this time, designating the center frequency of the frequency modulation to be (n), the frequency modulating circuit 7C allocates sine wave signals having frequencies (n+d) and (n−d) to the logic "1" and the logic "0" of the channel signal (ch), respectively, to generate the wobble signal WB. Further, at this time, the frequency modulating circuit 7C allocates the sine wave signals having the frequencies of (n+d) and (n−d) to the channel signal (ch) in units of 0.5 wave (period or cycle), whereby the wobble signal WB is generated so as to cross zero at the timings (ts) and (tc) corresponding to the bit center and the bit boundary of the wobble data ADIP, respectively.

That is, if the first and second reference clocks f1 and f2 are allocated so that the even-number channels are allocated at each of the first and second halves of each bit with respect to the timing (tc) corresponding to the center of each bit of the wobble data ADIP, and the period of the logic "1" and the period of the logic "0" are equal to each other at each of the first and second halves, the channel number of the logic "1" and the channel number of the logic "0" are kept equal to each other in the first and second halves in the channel signal (ch).

If the sine wave signals having the frequencies of (n−d) and (n+d) are allocated to the channel signal (ch) in units of 0.5 cycle, the phase deviation from the carrier signal of the frequency (n) can be offset in the period corresponding to the first and second halves of each bit of the wobble data ADIP to generate the wobble signal WB. Accordingly, the wobble signal WB can be generated so as to cross zero at the timings (ts) and (tc) corresponding to the bit center and the bit boundary of the wobble data ADIP.

Further, if the sine wave signals having the frequencies of (n−d) and (n+d) are allocated in units of 0.5 cycle, all the rise timing of the signal level of the wobble signal WB from zero level or all the falling timing of the signal level of the wobble signal WB to the zero level are kept at the timings (ts) and (tc) corresponding to the bit center and the bit boundary of the wobble data ADIP, and the accurate phase information of the carrier signal can be kept.

Accordingly, as shown in FIGS. 6A to 6F, by providing a binary representation of the wobble signal WB with respect to the zero level, a binary signal S1 having a rising edge or a trailing edge which is coincident with the timing of the edge of the channel signal can be generated (see FIGS. 6A to 6D). Accordingly, the clock CK and the wobble clock WCK are generated on the basis of the timing of the edge which is the accurate phase information, whereby a high-precision clock having no frequency variation and no phase variation can be generated (see FIGS. 6E and 6F). Further, as indicated by an arrow, in the residual edge, the phase difference $+\phi$ and $-\phi$ with respect to the clock CK thus generated represent the logic level at the first half side and the logic level at the second half side respectively, so that the wobble data ADIP can be decoded on the basis of the phase difference $+f$ and $-f$. Accordingly, in the wobble signal generating circuit 7, the groove is provided to generate the high-precision clock.

In this embodiment, the master disc 2 is developed to form the groove shape corresponding to the illuminating position of the laser beam on the surface of the master disc 2, and then subjected to the electro-forming processing to form a stamper. Further, a disc board is formed from the stamper, and a phase-variable film, a protection film, etc. are successively formed on the disc board to form an optical disc. Accordingly, the optical disc is formed so that the crystal structure of the phase-variable film can be locally varied by illuminating a laser beam to record desired data, and also so that a laser beam is directed to the optical disc to detect (reflected) light for reproducing recorded data.

Accordingly, in the optical disc, all the rise timing of the signal level of the wobble signal WB from the zero level and the falling timing of the signal level of the wobble signal WB to the zero level keep the accurate phase information of the carrier signal. Therefore, the period in which the groove traverses the track center from the inner portion to the outer portion or the period in which the groove traverses the track center from the outer portion to the inner portion is set to be constant, and the traversing operation timing is coincident with the zero-cross timing of the carrier signal.

Figure 7:
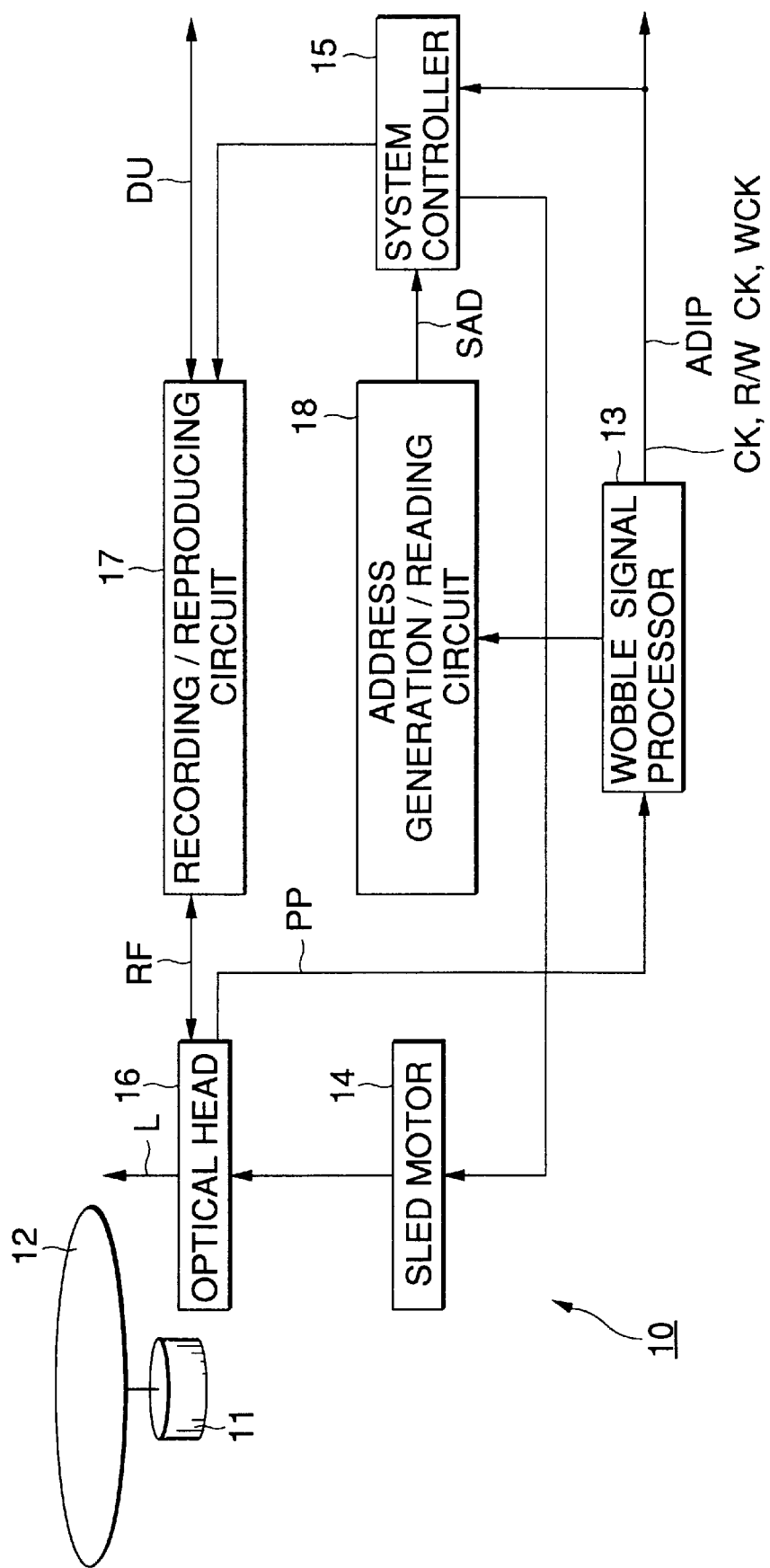
FIG. 7 is a block diagram showing an optical disc device for accessing an optical disc which is manufactured by the mastering device as shown in FIG. 3.

FIG. 7 is a block diagram showing an optical disc device for accessing the optical disc which is manufactured as described above. In the case of a CLV disc, a spindle motor 11 in an optical disc device 10 rotates an optical disc so that the wobble clock WCK detected from the optical disc 12 is equal to a predetermined frequency.

A sled motor 14 moves an optical head 16 in the radial direction of the optical disc 12 under the control of a system control circuit 15 to perform a seek operation on the optical disc 12 by the optical device 10.

The optical head 16 emits a laser beam L to the optical disc 12 and generates, on the basis of reflected light from the laser beam L, a push-pull signal PP whose signal level varies in accordance with the displacement of the groove from the illuminating position of the laser beam, a focus error signal whose signal level varies in accordance with a focus error amount and a reproduction signal RF whose signal level varies in accordance with the amount of the reflected light. On the other hand, in a recording operation, the laser beam is intermittently increased at the timing based on a writing/reading clock R/W CK to record desired data.

A recording/reproducing circuit 17 processes the reproduction signal RF obtained by the optical head in a reproducing operation to reproduce user data DU recorded on the optical disc 12, and then outputs the user data DU to external equipment. At this time, the recording/reproducing circuit 17 outputs the address data extracted from the reproduction signal RF to an address reading circuit 18.

The address reading circuit 18 analyzes the address data to detect a sector address of the reproduced data. The address reading circuit 18 generates a sector address corresponding to the illuminating position of the laser beam under the control of the system control circuit 15, generates the address data from the sector address and outputs the address data to the recording/reproducing circuit 17. In the recording operation, the recording/reproducing circuit 17 performs data processing on the user data DU input from the external equipment in a format which is suitable for the recording to the optical disc 12, and inserts the address data in the data sequence. Further, the recording/reproducing circuit 17 drives the optical disc 12 on the basis of the generated channel data and intermittently increases the intensity of the laser beam L to record the user data DU to the optical disc 12.

The system control circuit 15 comprises a computer for controlling the operation of the overall optical disc device 10 for controlling the operation of the sled motor 14, etc. on the basis of the frame number (Sync no) and the track number (track no) obtained from the wobble signal processing circuit 13 and switches the overall operation mode to control the overall operation in accordance with the illuminating position of the laser beam or under the control of external equipment.

The wobble signal processing circuit 13 extracts a wobble signal WB from the push-pull signal PP and processes the wobble signal WB to generate a wobble clock WCK, a clock CK and a writing/reading clock R/W CK. Further, the wobble signal processing circuit 13 detects the wobble data ADIP from the wobble signal WB and notifies the system control circuit 15.

Figure 8:
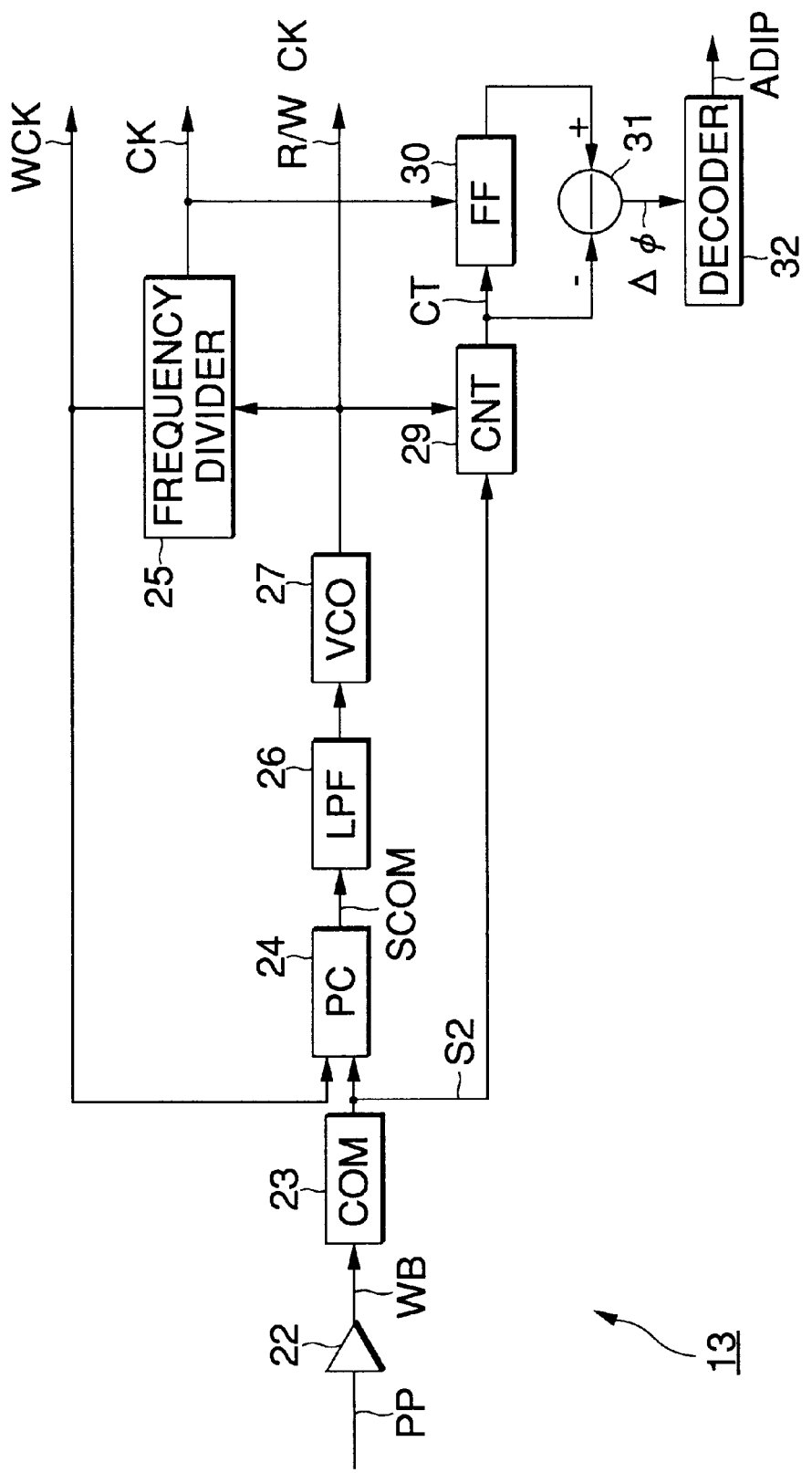
FIG. 8 is a block diagram showing a wobble signal processing circuit of the optical disc device of FIG. 7.
Figures 1, 2, 11A, 11B, 11C, 11D:
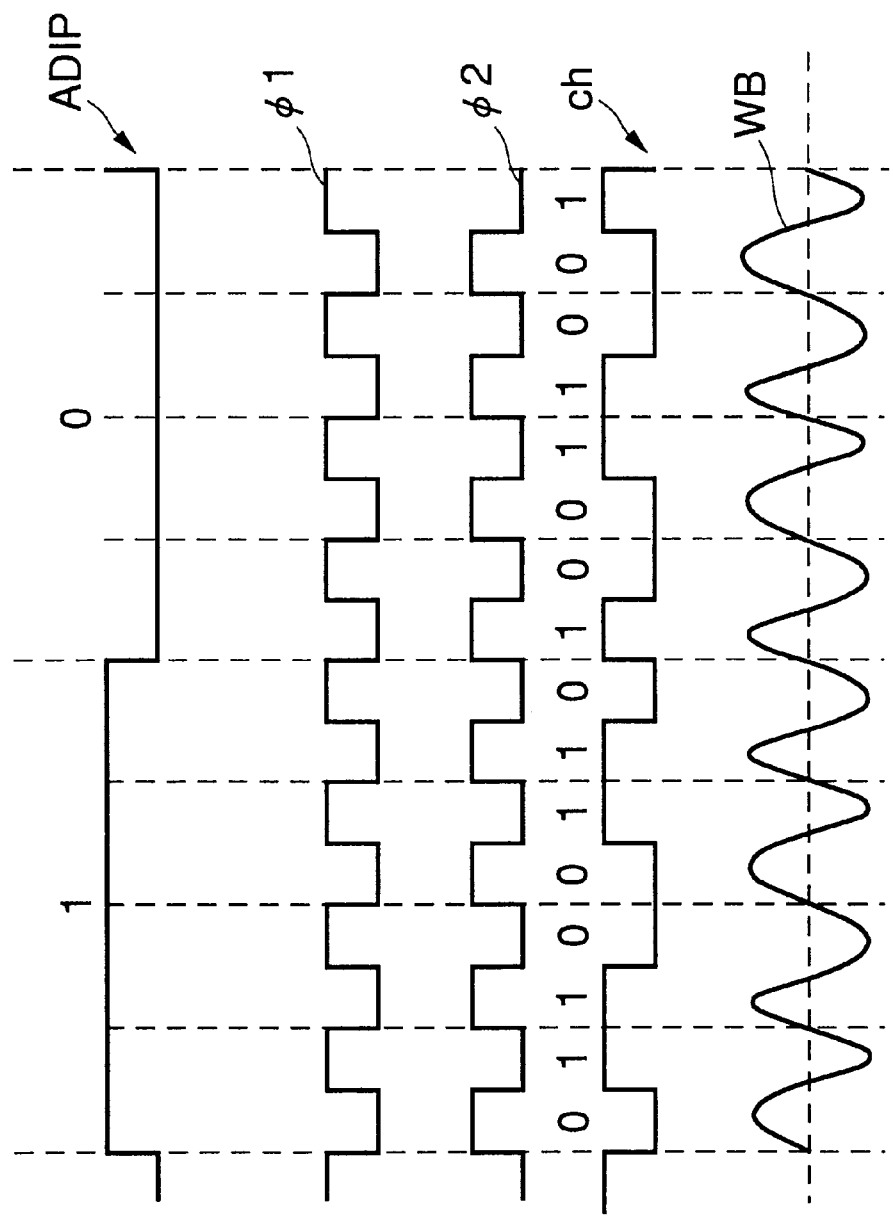
FIGS. 11A to 11D are signal waveform diagrams showing the generation of the wobble signal in a mastering device according to another embodiment of the present invention.

FIG. 8 is a block diagram showing the wobble signal processing circuit 13. The wobble signal processing circuit 13 amplifies the push-pull signal PP in an amplifying circuit 22 having a predetermined gain, and then extracts the wobble signal WB through a band-pass filter (not shown). As shown in FIGS. 9A to 9I, a comparison circuit (COM) 23 provides a binary representation of the wobble signal WB with respect to the zero level to generate a binary signal S2, thereby detecting the edge information on the basis of the wobble signal WB (FIGS. 9A to 9D). In the generated binary signal S2, all the rise edges or all the trailing edges thereof have accurate phase information.

A phase comparison circuit (PC) 24 comprises an exclusive OR circuit. The wobble clock WCK output from a frequency-dividing circuit 25 and the wobble signal WB are phase compared with each other, and the phase comparison information SCOM is output (FIGS. 9D to 9G). The low-pass filter (LPF) 26 limits the band of the phase comparison result and outputs the low-frequency components thereof to a voltage control oscillation circuit (VCO) 27. The voltage control oscillation circuit 27 outputs the write/read clock R/W CK on the basis of the output signal of the low-pass filter 26. At this time, the voltage control oscillation circuit 27 generates the write/read clock R/W CK on the basis of the frequency which is four times the frequency of the wobble signal WB. The frequency-dividing circuit 25 successively divides the frequency of the write/read clock R/W CK to generate the clock CK and the wobble clock WCK.

Accordingly, the phase comparison circuit 24, the frequency-dividing circuit 25, the low-pass filter 26 and the voltage control oscillation circuit 27 constitute the PLL circuit to generate the clocks R/W CK, CK, WK2 which are synchronized in phase with the timing at which the wobble signal crosses zero and goes up (the timing having the accurate phase information). In this case, the wobble clock WCK is shifted in phase by p/2 from the edge of the binary signal S2.

That is, in the optical disc, all the up timing of the signal level of the wobble signal WB from the zero level or all the down timing of the signal level of the wobble signal WB to the zero level maintain the accurate phase information of the carrier signal. Therefore, when the wobble clock WCK is synchronized in phase with the binary signal S2 as described above, the oscillation frequency is controlled so that the average value of the phase comparison result SCOM obtained through the low-pass filter 26 is set to a fixed value.

In this case, for example, when the phase of the wobble clock WCK is advanced (FIG. 9H), the oscillation frequency is controlled so that the average value is reduced (FIG. 9I) and the oscillation frequency is lowered by the amount corresponding to the advancement in the phase comparison result SCOM. Accordingly, the PLL circuit generates various clocks on the basis of the rising wobble signal WB having the accurate phase information.

In the binary signal S2 thus generated, during the period T from the rising logic level to the next rising level thereof, the difference between the period for which the logic level rises and the period for which the logic level falls is varied at the timing of the trailing edge during the period T. That is, this difference has the phase information of the timing at which the wobble signal WB crosses zero and falls.

The wobble signal processing circuit 13 reproduces the wobble data ADIP by effectively utilizing the above relationship. That is, as shown in FIGS. 10A to 10H, a counter (CNT) 29 clears a count value on the basis of the rising edge of the binary signal S2, and counts up the write/read clock R/W CK during the period for which the logic level of the binary signal S2 rises. Conversely, it counts down the write/read clock R/W CK during the period for which the logic level of the binary signal S2 falls (FIGS. 10A to 10F). The counter 29 detects the advance phase and the delay phase of the wobble signal WB with respect to the wobble clock WCK on the basis of the count value CNT with the half period of the wobble data ADIP set as a unit.

A flip-flop (FF) 30 delays the count value CNT by only the half period of the wobble data ADIP. A subtraction circuit 31 subtracts the output data of the counter 29 from the output data of the flip-flop 30, whereby on the basis of the bit boundary and the bit center of the wobble data ADIP, the subtraction circuit 31 detects the variation of the timing at which the wobble signal WB crosses zero before and after the bit boundary and the bit center. When this timing is to be advanced with respect to the wobble clock WCK, a negative value L2 which is two times the counter value CNT is output as the subtraction result. Conversely, when the timing is to be delayed with respect to the wobble clock WCK, a positive value H2 which is two times the count value CNT is output as the subtraction result (FIG. 10G).

When with respect to the bit boundary and the bit center the zero-cross timing of the wobble signal WB before and after is not varied, this before-and-after period can be judged as a bit boundary according to the phase modulation. Further, when the subtraction values before and after the bit boundary are positive and negative respectively, they are judged as the logic "1" and the logic "0" respectively in the wobble data ADIP. The subtraction value which is located at an interval from the bit boundary becomes a meaningless numerical value. In this embodiment, the bit inversion is set to be performed once in one address data block, whereby the bit boundary can be reliably detected during a predetermined period.

According to the above detection principle, a decoder 32 detects the bit boundary on the basis of the output data $\Delta\phi$ of the subtraction circuit 31. Further, on the basis of the detected bit boundary, the subtraction value $\Delta\phi$ is judged every period to decode and output the wobble data ADIP (FIGS. 10G and 10H).

In the above construction, according to the mastering device 1 (FIG. 3), when the laser beam L is emitted in the spiral pattern from the inner portion to the outer portion of the master disc 2 to form the track, the illuminating position of the laser beam is displaced in the radial direction of the master disc 2 on the basis of the wobble signal WB generated in the wobble signal generating circuit 7, whereby the groove is formed so as to be followed in accordance with the wobble data.

In the mastering device 1 are generated the track number (track no) whose value is successively incremented every revolution of the master disc 2, and the sync number (Sync no) whose value is successively incremented every 1/16 revolution of the master disc 2. Further, the error detection code CRCC having the track number (track no), the sync number (Sync no) and the reserving bit (rev) set to the information word M (x) is generated. At this time, the logic level of the error detection code CRCC is inverted and set, or the reserving bit (rev) is set so that the bit inversion necessarily occurs once in one address data block (FIGS. 4).

In the mastering device 1, the address data blocks are successively generated in synchronism with the rotation of the master disc 2, and the address data block thus generated are input as the wobble data ADIP into the wobble signal generating circuit 7.

Figure 5:
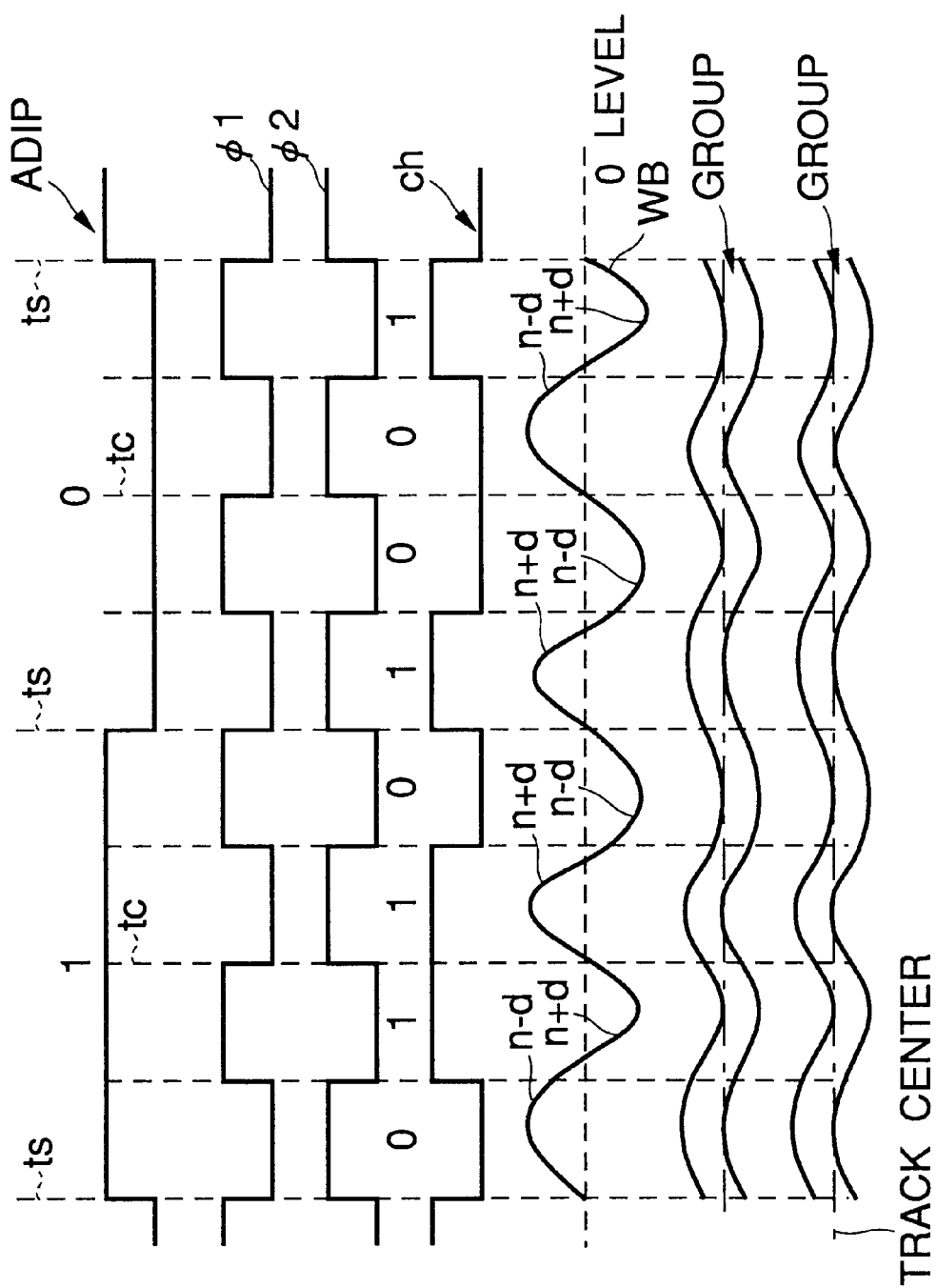
FIGS. 5A to 5E are signal waveform diagrams showing generation of a wobble signal according to one embodiment of the present invention.
Figure 6:
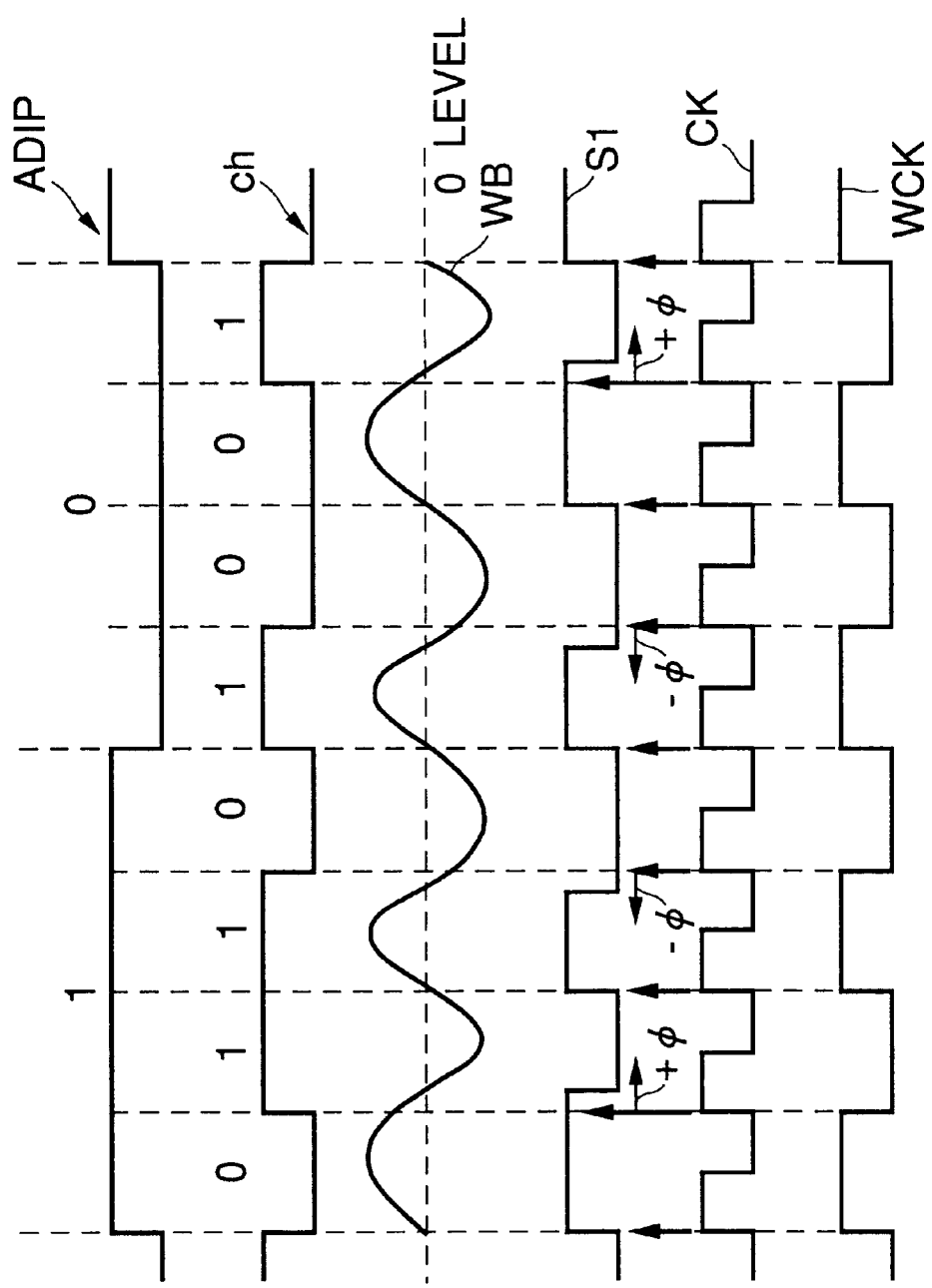
FIGS. 6A to 6F are signal waveform diagrams showing the relationship between a wobble signal and wobble data.

Here, the wobble data ADIP are subjected to the phase modulation in the phase modulation circuit 7B, and a first reference clock $\phi1$ synchronous with the phase of the reference signal and a second reference clock $\phi2$ which is different in phase from the first reference clock $\phi1$ by 180 degrees are successively supplied in accordance with the logic level to generate the channel signal (ch) (FIG. 5). At this time, the first and second reference clocks $\phi1$, $\phi2$ are allocated to the wobble data ADIP so that with the timing (tc) corresponding to the center of each bit of the wobble data ADIP as a boundary, channels of even number are formed at the first half and the second half of each bit and also the period of the logic "1" and the period of the logic "0" are equal to each other at each of the first and second half portions, whereby the modulated signal is formed so that the periods of the logic "1" and the logic "0" are equal to each other during the period of the first and second halves.

The sine wave signals having frequencies (n−d) and (n+d) of the channel signal (ch) are allocated to the channel signal (ch) in units of 0.5 cycle in the subsequent frequency modulation circuit 7C, whereby the wobble signal WB is formed so as to cross zero at the timings (ts) and (tc) corresponding to the bit center and the bit boundary of the wobble data ADIP.

At this time, with the timing (tc) corresponding to the center of each bit of the wobble data ADIP as a boundary, the channel signal (ch) is generated so that the channels of even number are formed at each of the first and second halves of each bit and the period of the logic "1" and the period of the logic "0" are equal to each other at these first and second halves, whereby the wobble signal WB is generated so as to cross zero at the timings (ts) and (tc) corresponding to the bit center and the bit boundary of the wobble data ADIP.

Further, the sine wave signals having the frequencies (n−d) and (n+d) are allocated in units of 0.5 cycle, whereby all the rising timing of the signal level of the wobble signal WB from the zero level or all the falling timing of the signal level of the wobble signal WB to the zero level are kept as the timings (ts) and (tc) corresponding to the bit center and the bit boundary of the wobble data ADIP, so that the accurate phase information of the carrier signal is maintained.

Further, at the timing of the zero crossing of the residual wobble signal WB having no precise phase information as described above, the phase corresponding to the wobble data ADIP is maintained, and thus the phase error is set to zero if averaged for one bit of the wobble data ADIP.

Accordingly, in the process of manufacturing the optical disc according to this embodiment, the optical disc is formed from the master disc 2 through predetermined steps in the mastering device 1, and the groove is formed on the optical disc so that the center of the groove traverses the track center at the timing corresponding to the bit boundary and the bit center of the wobble data.

In the case of a CLV disc, the optical disc device controls the spindle, etc. on the basis of the groove thus generated. Therefore, the high-precision clocks R/W CK, CK, WCK which are based on the groove are generated in the wobble signal processing circuit 13, and the wobble data ADIP (FIG. 7).

That is, in the wobble signal processing circuit 13 (FIGS. 8 and FIGS. 9A to 9I), the wobble signal WB is extracted on the basis of the push-pull signal PP whose signal level is varied in accordance with the position of the laser beam on the groove, and in the comparison circuit 23 the zero-cross timing is detected to obtain the edge information. Further, the clocks R/W CK, CK, WCK which are synchronized in phase with the other edge having the accurate phase information of the binary signal S2 output from the comparison circuit 23 are generated by the subsequent PLL circuit comprising the phase comparison circuit 24, the frequency-dividing circuit 25, the low-pass filter 26 and the voltage control oscillation circuit 27.

That is, in the binary signal S2, all the rising edges have the accurate phase information, and the residual (falling) edges have no phase error with respect to the timing of the edge having the accurate phase information if the residual edges are displaced in accordance with the wobble data ADIP and averaged in units of one bit of the wobble data ADIP. Accordingly, in this embodiment, the high-precision clock which has little frequency variation and little phase variation on average can be generated.

In the binary signal S2, on the basis of the timing of the rising edge, the counter 29 counts up or counts down the write/read clock R/W CK to count the timing at which the wobble signal WB crosses zero and falls down, every predetermined period based on the wobble clock WCK which is the period corresponding to the first and second halves of the wobble data. Further, in the subtraction circuit 31, the sequential count values are successively subtracted to detect the variation of this timing, and the phase of the timing at which the wobble signal WB crosses zero and falls down is detected on the basis of the above variation.

Accordingly, in the decoder 32, the bit boundary at which the phase does not vary is detected, and the wobble data ADIP are successively reproduced from the phase information based on the bit boundary.

According to the above, in the modulated signals based on the phase modulation which correspond to the first half portion and the second half portion of each bit of the serial data respectively, the phase modulation is performed so that the period of the logic "1" and the period of the logic "0" are equal to each other, and the sine wave signals having the frequencies (n−d) and (n+d) are allocated to the modulated signals based on the phase modulation in units of 0.5 cycle to generate the wobble signal WB, whereby the wobble signals can be generated so that the phase error is equal to zero if the wobble signals cross zero at the timings (ts) and (tc) corresponding to all the bit centers and all the bit boundaries of the wobble data ADIP and are averaged during one bit of the wobble data ADIP. Accordingly, by following the groove on the basis of the wobble signal, the high-precision clock which has little frequency variation and little phase variation on average can be generated.

Further, the variation is made in accordance with the wobble data at the zero-cross timing of the wobble signal which does not correspond to the bit center and the bit boundary of the wobble data, and thus the wobble data can be easily reproduced.

Still further, the bit boundary can be also detected by counting pulse edges based on the wobble clock WCK, whereby the bit synchronization can be easily established. When a pre-groove is formed according to the CLV system, cross-talk due to adjacent tracks in the address reproducing operation can be reduced.

(2) Other Embodiments

The above-described embodiment is directed to the case where the phase modulation is performed so that four channels are allocated to one bit of the wobble data ADIP. However, the present invention is not limited to this case, and it is widely applicable to a case where channels of even number are allocated to each of the first and second halves of each bit of the wobble data ADIP. For example, a case where four channels allocated to each of the first and second halves of each bit of the wobble data ADIP is shown in FIGS. 11A–11D.

Figures 12A, 12B, 12C:
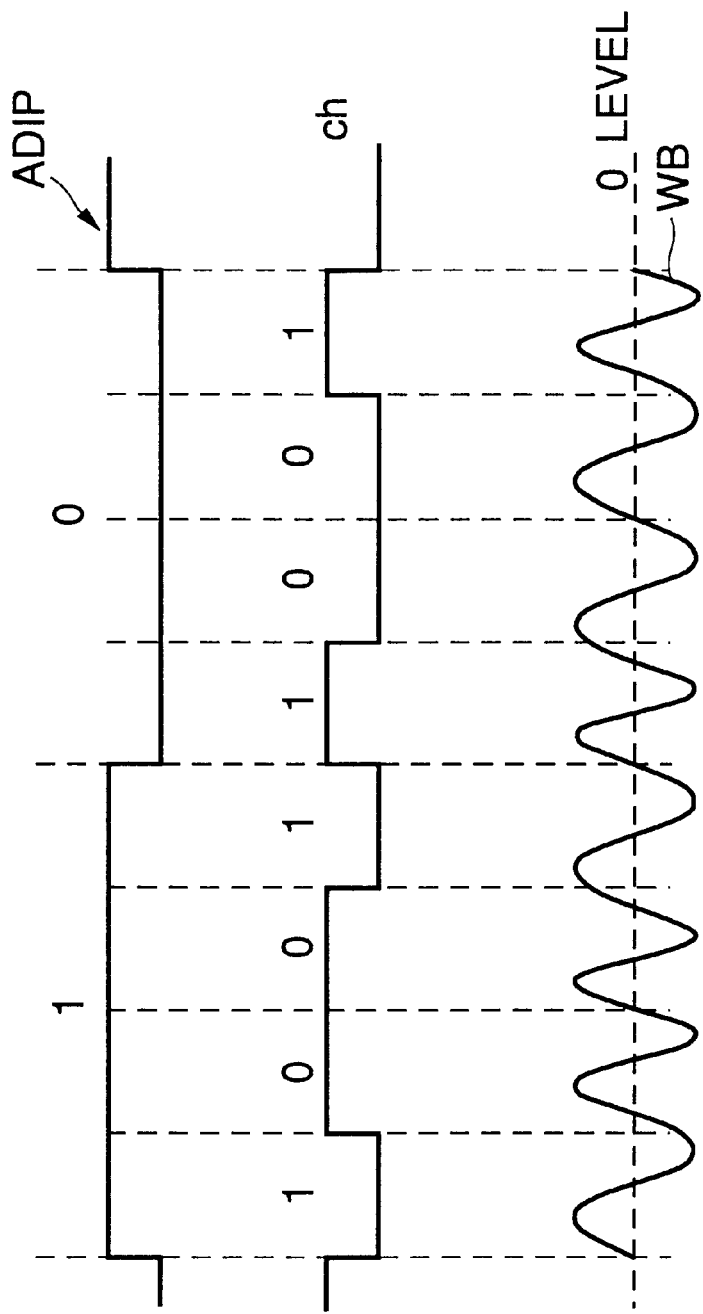
FIGS. 12A to 12C are signal waveform diagrams showing the generation of the wobble signal according to the embodiment of FIGS. 11A to 11D.

Further, in the first embodiment (referred to hereinafter as the previous embodiment), 0.5 cycle based on the frequencies of (n+d) and (n−d) is successively allocated to the modulated signal based on the phase modulation to generate the modulated signal based on the frequency modulation. The present invention is not limited to this mode, and it is applicable to a case where the sine wave signal is allocated to each channel in units of one wave (cycle) as shown in FIGS. 12A–12C. That is, the number of the frequency (cycles) corresponding to the high logic level of the modulated signal on the basis of the phase modulation is equal to the number of the frequency cycles corresponding to the low logic level of the modulated signal on the basis of the phase modulation, and the high-precision clock having substantially no frequency and phase variation on average can be generated. In addition, the bit decoding errors can be reduced.

Figure 13:
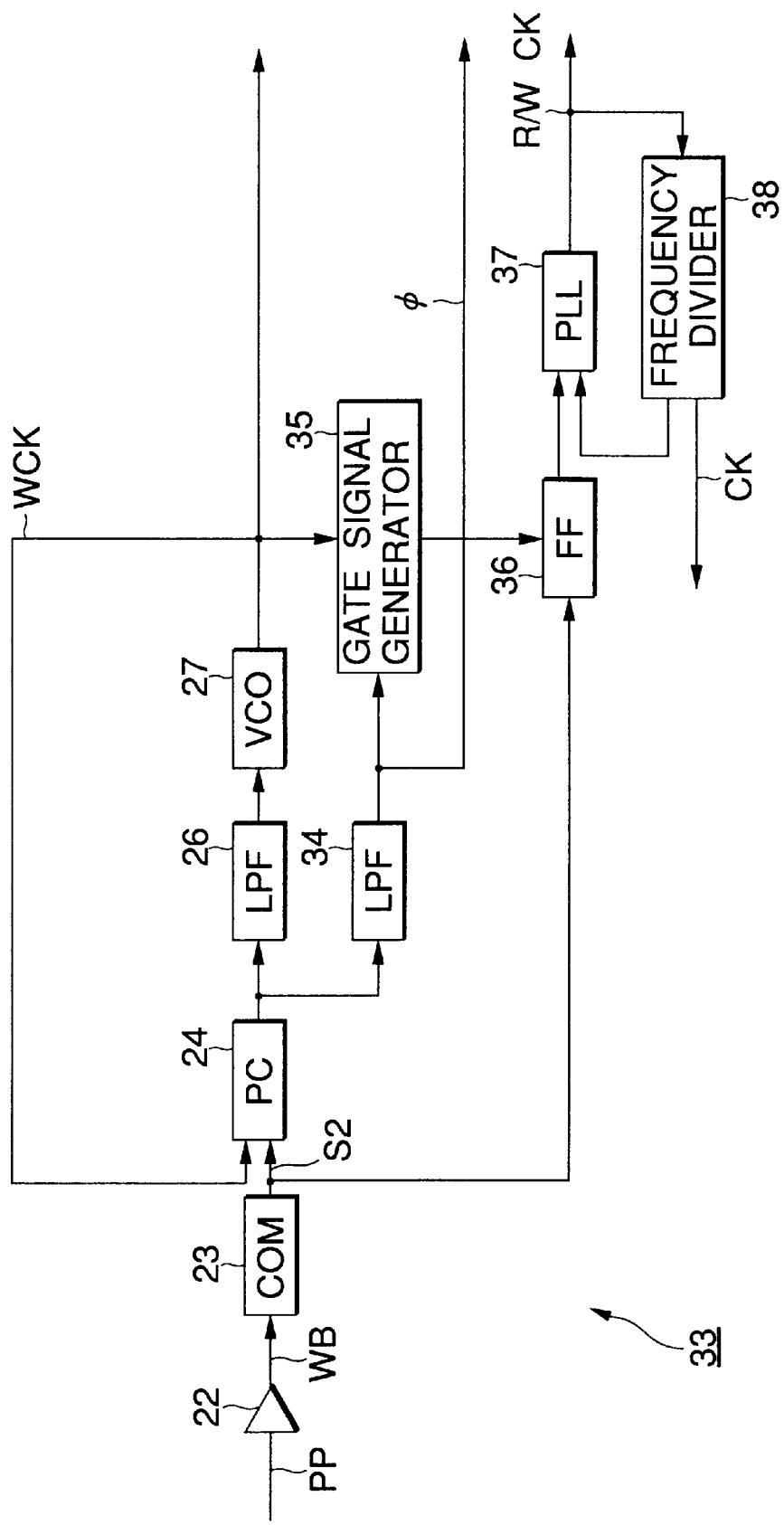
FIG. 13 is a block diagram showing the wobble signal processing circuit of the optical disc device according to yet another embodiment.

Further, in the previous embodiment, the clocks CK, WCK, etc. which are in phase with the wobble signal are generated by using the fact that the phase error of the wobble signal could be offset if the averaging operation is performed on one bit of the wobble data. However, the present invention is not limited to this mode, and it is applicable to a case where only the edge having the accurate phase information is selectively used to generate a high-precision clock as shown in FIG. 13 as compared with FIG. 8. That is, in the wobble signal processing circuit 33 shown in FIG. 13, the phase information is extracted by the low-pass filter 34; and the phase information and the phase of the wobble clock WCK are compared with each other in the gate signal generating circuit 35 to detect the timing at which the accurate phase information appears. Further, in the gate signal generating circuit 35, the gate signal based on this accurate timing is generated, the operation of the flip-flop circuit 36 is controlled by the generated gate signal, and the binary signal based on this accurate timing is input to the PLL circuit 37. In the PLL circuit 37, a feedback loop is formed through the frequency-dividing circuit 38, and the clocks R/W CK, CK having desired frequencies are generated on the basis of the binary signal S2.

In the previous embodiment, the counting operation of the timing of the trailing edge of the binary signal is performed to decode the wobble data. However, the present invention is not limited to this mode, and the wobble data may be decoded on the basis of the phase information which is obtained through the low-pass filter 34 as shown in FIG. 13. Further, as shown in FIGS. 14A–14H, when the modulated signal based on the frequency modulation is generated in units of 0.5 cycle, the phase may be detected on the basis of the polarity of the wobble signal WB in order to decode the wobble data. As shown in FIGS. 14A–14H, the signal S2 or the wobble signal WB is represented in binary form (FIGS. 14A to 14E) to generate a polarity signal S3 representing the polarity of the wobble signal WB (FIG. 14F). Here, + and − represent the positive side and the negative side, and 0 represents zero-cross of the wobble signal WB when the same polarity is sequential through zero (i.e., the polarities at both sides of zero are the same as indicated by arrows A and B in FIG. 14F), it is ascertained as a bit boundary. Further, as indicated by the arrow, by examining the variation of the logic level at the first half and the second half of each bit on the basis of the polarity of the polarity signal S3, the channel signal (ch) can be decoded (FIG. 14G) such that based on the bit boundary the wobble data ADIP is obtained (FIG. 14H).

In the previous embodiment, the error detection code is allocated to the wobble data. However, the present invention is not limited to this mode, and the error detection code may be omitted when the frame synchronization can be detected with sufficient reliability. For example, the present invention may be applied to a case where sufficient reliability can be ensured through the comparison of the track number and/or the sync number by repeating the same track number and/or the sync number a number of times.

Further, in the previous embodiment, the wobble data are generated from the address data blocks which are sequential so that the track numbers and/or the sync numbers are successively varied, and the wobble signals are generated on the basis of the wobble data. However, the present invention is not limited to this mode, and it is widely applicable to a case where the same address data block is repetitively allocated a predetermined number of times to generate the wobble signals.

Still further, in the previous embodiment, the wobble signals are set so that the signal level of the wobble signal traverses the zero-level at the bit boundary and the bit center of the wobble data. However, the present invention is not limited to this mode, and the wobble signals may be set so that the signal level thereof traverses a fixed reference level in place of the zero-level. That is, when the wobble signals are generated so as to traverse a fixed reference level at the timing corresponding to the bit boundary or bit center of the wobble data, the phase of the wobble signal is kept at the corresponding timing. Accordingly, if the processing operation is performed in consideration of this fixed phase at the reproduction side of the wobble signals, a high-precision clock can be generated on the basis of the accurate phase information, and the same result as in the above-described embodiment can be obtained. In this case, it is necessary to alter the reference level of the comparison circuit for providing a binary representation of the wobble signals or the like.

In the previous embodiment, the entire groove is provided on the basis of the wobble signal. However, the present invention is not limited to this mode, and it is applicable to a case where only the edge at one side of the groove is provided or a case where both edges are traced on the basis of different wobble signals respectively.

Further, in the previous embodiment, the phase information is detected on the basis of the binary processing in the comparison circuit. However, the present invention is not limited to this mode, and it is widely applicable to a case where the wobble signal is directly subjected to the phase comparison.

Still further, in the previous embodiment, the wobble signal is generated on the basis of the frequencies of (n+d) [Hz/ch] and (n−d) [Hz/ch]. However, the present invention is not limited to this mode, and it is widely applicable to a case where a reference signal for timing detection is inserted to generate the wobble signal.

In the previous embodiment, the wobble signal is generated on the basis of the address data comprising the track number and the sync number. However, the present invention is not limited to this mode, and it is widely applicable to a case where the wobble signal is generated on the basis of the address data comprising time information.

Further, in the previous embodiment, a phase-variation type optical disc has been described. However, the present invention is not limited to this mode, and it may be widely applied to a write-once type optical disc, a magneto-optical disc, a read-only optical disc, etc.

As described above, according to the present invention, when the serial data are subjected to the phase modulation and then subjected to the frequency modulation, the phase modulation is performed so that the period of the logic "1" and the period of the logic "0" are equal to each other in the modulated signals based on the phase modulation which correspond to the first and second half portions of each bit of the serial data. The frequency modulation is performed so that the frequency cycles corresponding to the respective logic level "1" and "0" are equal to each other in the modulated signals based on the frequency modulation. As a result, if the averaging operation is performed within one bit of the serial data, the modulated signals based on the frequency modulation can be generated so that the phase error is equal to zero. Accordingly, a high-precision clock having very little frequency and phase variation can be generated by tracing the groove of the modulated signals.

What is claimed is:

1. A method for manufacturing an optical disc with a groove for defining serial data containing a plurality of bits, said method comprising the steps of:

generating modulated signal by phase modulating the serial data such that a first time interval for a high logic level is equal to a second time interval for a low logic level;

generating a second modulated signal by frequency modulating said first modulated signal such that at least one frequency cycle representing a portion of a high bit of said serial data, and at least one frequency cycle representing a portion of a low bit of said serial data, each corresponds in duration to one of said high logic levels combined with one of said low logic levels of the first modulated signal, and such that a first frequency component in each said frequency cycle corresponds to said high logic level and a second, different frequency component in each said frequency cycle corresponds to said low logic level; and providing said groove on said optical disc in accordance with the generated second modulated signal.

2. The method according to claim 1, wherein said first frequency component is higher in frequency than said second frequency component.

3. The method according to claim 1, wherein each of said first and second time intervals is divided into a number of time intervals each being of shorter duration than said first or second time interval, wherein one of the shorter duration time intervals for said high logic level is equal to another of the shorter duration time intervals for said low logic level.

4. An optical disc, comprising:

a groove for defining serial data containing a plurality of bits, said groove obtained by generating a first modulated signal by phase modulating the serial data such that a first time interval for a high logic level is equal to a second time interval for a low logic level, and by generating a second modulated signal by frequency modulating said first modulated signal such that at least one frequency cycle representing a portion of a high bit of said serial data, and at least one frequency cycle representing a portion of a low bit of said serial data, each corresponds in duration to one of said high logic levels combined with one of said low logic levels of the first modulated signal, and such that a first frequency component in each said frequency cycle corresponds to said high logic level and a second, different frequency component in each said frequency cycle corresponds to said low logic level.

5. The optical disc according to claim 4, wherein said first frequency component is higher in frequency than said second frequency component.

6. The optical disc according to claim 4, wherein each of said first and second time intervals is divided into a number of time intervals each being of shorter duration than said first or second time interval, wherein one of the shorter duration time intervals for said high logic level is equal to another of the shorter duration time intervals for said low logic level.

7. Optical disc apparatus for accessing an optical disc with a spiral groove, said optical disc having serial data recorded thereon using said spiral groove, said apparatus comprising:

a wobble signal detector for detecting a wobble signal having a signal level varied in accordance with said spiral groove, said wobble signal being defined by the recorded serial data;

a clock generator for generating a clock signal based on a detection of periodic zero crossings of the wobble signal in constant time intervals, the generated clock signal being synchronized with the detected wobble signal; and a decoder for decoding the recorded serial data from the detected wobble signal based on a phase of the detected wobble signal by determining a polarity of the detected wobble signal with respect to the generated clock signal.

8. Optical disc apparatus for accessing an optical disc with a spiral groove, said optical disc having serial data recorded thereon using said spiral groove, said apparatus comprising:

a wobble signal detector for detecting a wobble signal having a signal level varied in accordance with said spiral groove, said wobble signal being defined by the recorded serial data;

a clock generator for generating a clock signal, based on the detection of periodic zero crossings of the wobble signal in constant time intervals, the generated clock signal being synchronized with the detected wobble signal; and a decoder for decoding the recorded serial data from the detected wobble signal based on a phase of the detected wobble signal by determining zero-crossings of the detected wobble signal every predetermined period based on the generated clock signal.

9. The method according to claim 1, wherein said at least one frequency cycle representing a portion of a high bit of said serial data is a single frequency cycle that represents a first portion of said high bit and has a first half cycle at a frequency of said first frequency component and a second half cycle at a frequency of said second frequency component, and the at least one frequency cycle representing a portion of a low bit of said serial data is a single frequency cycle that represents a first portion of said low bit and has a first half cycle at a frequency of said second frequency component and a second half cycle at a frequency of said first frequency component.

10. The optical disc according to claim 4, wherein said at least one frequency cycle representing a portion of a high bit of said serial data is a single frequency cycle that represents a first portion of said high bit and has a first half cycle at a frequency of said first frequency component and a second half cycle at a frequency of said second frequency component, and the at least one frequency cycle representing a portion of a low bit of said serial data is a single frequency cycle that represents a first portion of said low bit and has a first half cycle at a frequency of said second frequency component and a second half cycle at a frequency of said first frequency component.

11. The optical disc apparatus according to claim 7, wherein each of said constant time intervals is the time interval of a single, full sine wave of the detected wobble signal.

12. The optical disc apparatus according to claim 7, wherein each of said constant time intervals is the time interval of two full sine waves of the detected wobble signal.

13. The optical disc apparatus according to claim 7, wherein each of said constant time intervals is the time interval corresponding to one half the duration of a logic high or logic low pulse of the serial data.

14. The optical disc apparatus according to claim 8, wherein each of said constant time intervals is the time interval of a single, full sine wave of the detected wobble signal.

15. The optical disc apparatus according to claim 8, wherein each of said constant time intervals is the time interval of two full sine waves of the detected wobble signal.

16. The optical disc apparatus according to claim 8, wherein each of said constant time intervals is the time interval corresponding to one half the duration of a logic high or logic low pulse of the serial data.

* * * * *